United States Patent [19]
Furukawa et al.

[11] 3,919,184
[45] Nov. 11, 1975

[54] NOVEL ACETYLENE-CONJUGATED DIENE COMPOUND LINEAR RANDOM COPOLYMERS AND A METHOD OF PRODUCTION THEREOF

[75] Inventors: Junji Furukawa, Kyoto; Eiichi Kobayashi; Takahiro Kawagoe, both of Uji, all of Japan

[73] Assignee: Bridgestone Tire Company Limited, Tokyo, Japan

[22] Filed: Nov. 19, 1973

[21] Appl. No.: 417,205

[30] Foreign Application Priority Data
Nov. 21, 1972  Japan............................ 47-117303
Mar. 17, 1973  Japan.............................. 48-31254

[52] U.S. Cl........................ 260/87.5 R; 260/85.3 R
[51] Int. Cl............................................. C08f 23/00
[58] Field of Search................... 260/85.3 R, 87.5 R

[56] References Cited
UNITED STATES PATENTS
3,346,546  10/1967  Beach et al.................. 260/85.3 R
3,661,882  5/1972  Hawkins et al................ 260/85.3 R

*Primary Examiner*—Joseph L. Schofer
*Assistant Examiner*—A. Holler
*Attorney, Agent, or Firm*—Stevens, Davis, Miller & Mosher

[57] ABSTRACT

Novel copolymers in which acetylene and a conjugated diene compound are bonded linearly and randomly and the conjugated diene compound is bonded substantially in 1,4-structure, are produced by copolymerizing acetylene and the conjugated diene compound by means of a catalyst system consisting of dialkylaluminum chloride or a similar substance to said chloride and organic acid salts or organic complexes of nickel.

Said random copolymers have a large number of diallyl type active methylenes due to acetylene-conjugated diene bond and therefore said copolymers have a high chemical reactivity and are used commercially broadly.

16 Claims, 4 Drawing Figures

FIG_1

FIG_2

FIG_3

FIG_4

NOVEL ACETYLENE-CONJUGATED DIENE COMPOUND LINEAR RANDOM COPOLYMERS AND A METHOD OF PRODUCTION THEREOF

BACKGROUND OF THE INVENTION

1. Field of the Invention

The present invention relates to novel copolymers in which acetylene and a conjugated diene compound are bonded linearly and randomly and the conjugate diene compound is bonded substantially in any one of cis-1,4-bond and trans-1,4-bond and relates to a method for producing said copolymers.

2. Description of the Prior Art

It has been well known that acetylene and conjugated diene compounds are considerably different in the polymerization reactivity and therefore these compounds are very difficult in the copolymerize. In general, when the copolymerization reaction is effected in a combination of the monomers having considerably different polymerization reactivities, a mixture of homopolymers of both the monomers or a block copolymer is obtained. For example, Italian Pat. No. 665,277 discloses a method for copolymerizing acetylene and butadiene into a block copolymer.

The random copolymers of acetylene and a conjugated diene compound according to the present invention are quite novel copolymers in which acetylene and a conjugated diene compound are bonded linearly and randomly. These copolymers are novel compounds in which the conjugated diene compound units have 1,4-bonds. The 1,4-bonds have cis-type and trans-type but when the conjugated diene is, for example, butadiene or isoprene, these compounds are bonded substantially in cis-type, while in the case ob 2,3-dimethylbutadiene or chloroprene, these compounds are bonded substantially in trans-type and any one of 1,4-structures is formed. The copolymers in which acetylene and the conjugated diene compound are bonded linearly and randomly and the conjugated dienes are bonded in any one of cis-1,4-bond and trans-1,4-bond have never been known and the method for producing said copolymers also has never been known.

The catalysts used in Italian Pat. No. 665,277 for obtaining the above described block copolymers are obtained by combining organic metal compounds of Groups I–III of the Periodic Table and transition metal compounds of Groups IV–VIII and as the embodiment, the catalyst systems of $(C_2H_5)_3Al$-$TiCl_4$, $(C_2H_5)_3Al$-$VOCl_3$, $(C_2H_5)_3Al$-$NiCl_2$, $(C_2H_5)_{1.5}AlCl_{1.5}$-$TiCl_4$ are listed. When a combination of the monomers to be used in the present invention, for example, acetylene and butadiene or isoprene is subjected to copolymerization reaction by using these catalyst systems, the products obtained by the catalyst systems other than $(C_2H_5)_{1.5}AlCl_{1.5}$-$TiCl_4$ catalyst system are polymers wherein acetylene is bonded in a block and therefore said polymers are black and a major part of them is insoluble in organic solvents, such as chloroform, toluene and the like. This will be clarified by Comparative Examples hereinafter mentioned. On the contrary, when acetylene and the conjugated diene are subjected to a copolymerization reaction by using the catalyst system of the present invention, the products are random copolymers and the major part is soluble in organic solvents, such as chloroform, toluene and the like. Furthermore, it is a characteristic that the catalyst systems of the present invention are much higher in the polymerization activity than the examples of the catalyst systems of the above described Italian patent and these systems show several times — 10 several times of polymerization activity with respect to the total product. With respect to the solvent soluble portion, these systems show 10–200 times of polymerization activity. When the monomer combination to be used in the present invention, for example, acetylene and butadiene or isoprene is subjected to a copolymerization reaction by means of $(C_2H_5)_{1.5}AlCl_{1.5}$-$TiCl_4$ catalyst system, the polymer soluble in organic solvent may be obtained but from the nuclear magnetic resonance spectrum analysis, it has been found that the product is cyclized polymer of butadiene or isoprene having a large number of cyclic structures and that acetylene is not copolymerized. This will be clarified by Comparative Examples described hereinafter.

When acetylene is bonded in the polymeric chain in a block, the solubility in the solvent is very poor and therefore the catalyst residue is contained in the polymer and adversely affects the physical properties of the product. Furthermore, when the acetylene block is long, such polymer becomes insoluble and infusible and is not substantially used in commercial products.

On the contrary, the linear random copolymers obtained in the present invention are very high in the solubility in solvents and have remarkable merits in view of the production process of the polymers and the purification of the polymers. The random copolymers are very useful as the commercial product owing to the high solubility and fusibility. The acetylene-conjugated diene copolymers obtained in the present invention are substantially colorless or are light yellow or light red and the coloration of the copolymers themselves is low and these copolymers are used broadly as the starting materials of various products.

Furthermore, as a great characteristic many diallyl type active methylene groups due to acetylene-conjugated diene random bond structure are obtained, so that the reactivity is very high and the copolymers are very useful as various compositions and starting materials for various derivatives.

SUMMARY OF THE INVENTION

The present invention relates to linear random copolymers of acetylene and a conjugated diene in which the diene portion is bonded in 1,4-type and the acetylene content is less than 70 mol%, obtained by copolymerizing (1) acetylene and (2) a conjugated diene compound having the general formula wherein $R_a$ and $R_b$ represent hydrogen, halogen atom or hydrocarbon residue having 1–6 carbon atoms by means of a catalyst consisting of A. at least one of dialkylaluminum chlorides having the general formula wherein R represents hydrocarbon residue having 1–6 carbon atoms, or a reaction mixture of at least one of aluminum chloride compounds having the general formula wherein R' represents hydrocarbon residue having 1–6 carbon atoms and $n$ is 3, 2 or 1.5 with at least one of trialkylaluminum compounds having the general formula
R″₃Al
wherein R″ represents hydrocarbon residue having 1–6 carbon atoms, the molar ratio of the sum of R′ and R″ to Cl being 1.8–2.2, and B. at least one of organic acid salts and organic complexes of nickel, the molar ratio of Al atom in (A) component to Ni atom in (B) component being 1–100, in a solvent of aliphatic, alicyclic, aromatic hydrocarbons and halogen derivatives thereof at a temperature of −80°C ∼ +100°C, the composition of acetylene based on the total monomer feed amount being less than 60 mol%.

The combination of the catalysts to attain the object of the present invention is severely limited and can not easily conceived from Italian Pat. No. 665,227. That is, when acetylene and butadiene, for example, are subjected to a copolymerization reaction by combining the other organic aluminum compound (for example, trialkylaluminum) instead of the above described (A) component with an organic acid salt of nickel, a black polymer having acetylene block and insoluble in an organic solvent is produced as the main product but the copolymer having the characteristic as in the present invention can not be obtained. When acetylene and butadiene, for example, are subjected to copolymerization reaction by means of a catalyst obtained by combining the other nickel compound (for example, nickel halide) instead of the above described (B) component with dialkylaluminum chloride, the polymerization activity is very low and only a small amount of polymer having a very large amount of cyclic structures is obtained and the polymers having the characteristic as in the present invention can not be obtained.

DETAILED DESCRIPTION OF THE PREFERRED EMBODIMENTS

The conjugated diene compounds to be used in the present invention are shown by the following general formula wherein $R_a$ and $R_b$ represent hydrogen, halogen atom or hydrocarbon residue having 1–6 carbon atoms. Embodiments of $R_a$ and $R_b$ are hydrogen, fluorine, chlorine, bromine, iodine, methyl group, ethyl group, propyl group, butyl group, pentyl group, hexyl group and the like.

In the production of the copolymers, the feeding ratio of acetylene and the conjugated diene compounds is less than 60 mol% as acetylene mol%. Particularly, said ratio is preferred to be less than 40 mol%. In the above monomer ratio, the acetylene content in the resulting copolymers is at most less than 70 mol%. Even in the feeding ratio of acetylene of more than 60 mol%, acetylene and the conjugated dienes may form random copolymers but the solubility of the product in organic solvent lowers and such a ratio is not preferable.

The catalyst to be used in the present invention will be explained in detail hereinafter.

The catalytic component (A) according to the present invention is at least one of dialkylaluminum chlorides having the general formula
R₂AlCl
wherein R is hydrocarbon residue having 1–6 carbon atoms or a reaction mixture of at least one of aluminum chloride compounds having the general formula
R′₃₋ₙAlClₙ
wherein R′ represents hydrocarbon residue having 1–6 carbon atoms and n is 3, 2 or 1.5 with at least one of trialkylaluminum compounds having the general formula
R″₃Al
wherein R″ represents hydrocarbon residue of 1–6 carbon atoms, the molar ratio of the sum of R′ and R″ to Cl being 1.8–2.2.

The dialkylaluminum chlorides having the above general formula R₂AlCl are, for example, dimethylaluminum chloride, diethylaluminum chloride, dipropylaluminum chloride, dibutylaluminum chloride, dipentylaluminum chloride, dihexylaluminum chloride and the like. Among them, diethylaluminum chloride is particularly preferable.

The aluminum chloride compounds having the above general formula R′₃₋ₙAlClₙ are, for example, aluminum trichloride, alkylaluminum dichloride, alkylaluminum sesquichloride and R′ group includes methyl group, ethyl group, propyl group, butyl group, pentyl group, hexyl group and the like.

Trialkylaluminums having the above general formula R″₃Al are, for example, trimethylaluminum, triethylaluminum, tripropylaluminum, tributylaluminum, tripentylaluminum, trihexylaluminum and the like.

The catalytic component (B) of the present invention is at least one of organic acid salts and organic complexes of nickel, for example, nickel formate, nickel acetate, nickel naphthenate, nickel benzoate, nickel palmitate, nickel octenate, nickel stearate, nickel toluylate, nickel oxalate, nickel ethylbenzoate, nickelcyclohexylbutyrate, nickel acetylacetonate, nickel acetoacetic acid ethylester, dicyclopentadienylnickel, nickelsalicylaldehyde, nickelcarbonyl, π-allylnickel, π-crotylnickel, bis-1,5-cyclooctadienenickel and the like and mixtures thereof. Among them, nickel naphthenate, nickel formate and nickel benzoate are particularly preferable.

The molar ratio of Al to Ni in the catalyst of the present invention is 1–100, preferably 2–30, more particularly 4–20. The concentration of the catalyst is not particularly limited but in general it is preferable to use the nickel compound in an amount of $10^{-5}$–$10^{-1}$ mol based on 1 mol of monomers.

The polymerization catalyst is prepared by mixing the catalytic components in a solvent to be used for the polymerization reaction or without using said solvent in the presence or in the absence of monomers.

The preparation of the catalyst is carried out at a temperature range of −80°C ∼ +100°C under an inert gaseous atmosphere and a temperature of −78°C ~+60°C is usually used.

The polymerization reaction is generally effected by contacting the monomers with the catalyst in the solvent. For example, the monomers are introduced in the gaseous form into the polymerizing vessel containing the catalyst, the monomers in a liquid form or a solution form are introduced into the polymerizing vessel or the catalyst is added to the monomer solution.

The solvents to be used in the polymerization reaction include aliphatic, alicyclic and aromatic hydrocarbons and the halogen derivatives thereof. Particularly, the good result can be obtained by using aromatic hydrocarbons or halogenated hydrocarbons. The aromatic hydrocarbons are, for example, benzene, toluene, xylene, ethylbenzene and the like.

The halogenated hydrocarbons are, for example, dichloromethane, dichloroethane, trichloroethylene, tetrachloroethylene, tetrachloroethane, chlorobenzene, dichlorobenzene, bromobenzene and the like.

The solvent is usually used in a dried state.

The polymerization reaction is generally effected under atmosphere of the monomer gas and the solvent vapor and/or an inert gaseous atmosphere under atmospheric pressure or pressure. The polymerization temperature is −80°C ~ +100°C. In general, said temperature is preferred to be 0°C ~ +60°C, more particularly +20°C ~ +40°C.

After the completion of the polymerization reaction, the after-treatment is effected in a conventional process and the resulting copolymers are purified and recovered. As such processes, alcohol treatment, alcohol-hydrochloric acid treatment, hydrochloric acid-water treatment, alkali treatment, steam treatment or after-treatments used in the polymerization using the conventional Ziegler, Natta-type catalyst are applied. Since the resulting copolymers contain diallyl type active methylene, the copolymers are liable to be gelled, so that the polymers are storaged under an inert atmosphere or added with an antioxidant for rubber (for example, 2,6-di-tert-butyl-p-cresol, etc.).

It will be proved that linear random copolymers can be obtained with respect to a combination of acetylene and butadiene as an embodiment of the acetylene-conjugated diene random copolymers of the present invention.

The microstructure of the copolymer was analyzed by measuring the infrared absorption spectrum of the copolymer in a carbon disulfide solution according to the Morero method (D. Morero et al., Chim. e. Ind., 41, 758 (1959). As the result, it was found that the microstructure of the double bond of the copolymer contained at least 80% of cis-type bonds, and in many cases, at least 85% of cis-type bonds. The infrared absorption spectrum of the copolymer measured by a thin film method on a KBr plate was substantially the same as that of the spectrum of the conventional cis-1,4-polybutadiene. This shows that the copolymer of the present invention is a linear copolymer having a cis-type structure similar to cis-1,4-polybutadiene.

Figure 1:
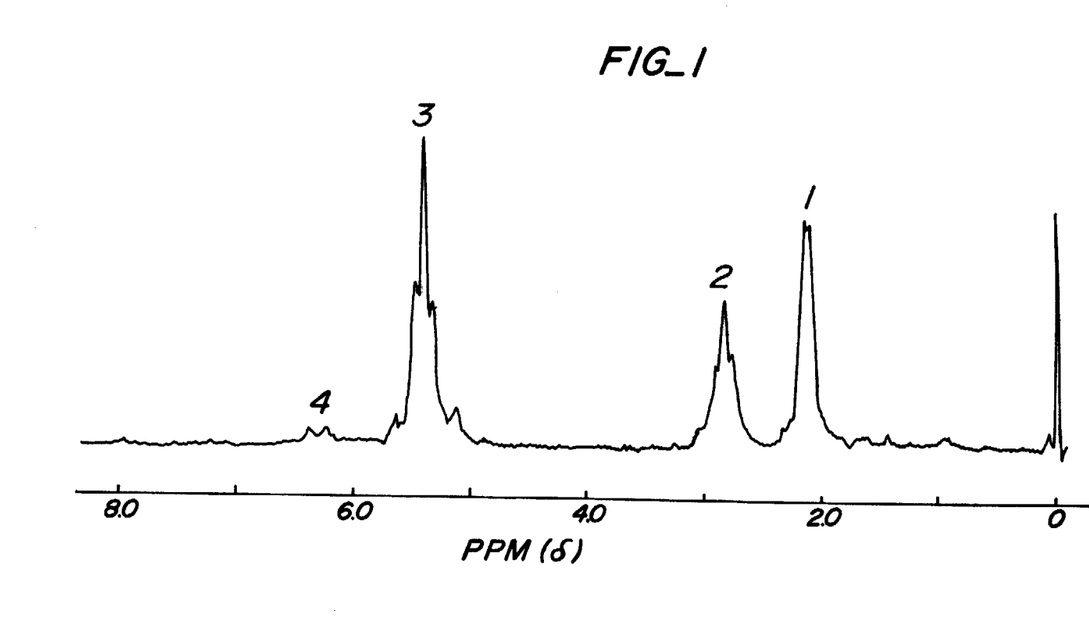
FIG. 1 is the nuclear magnetic resonance spectrum of the linear random copolymer of acetylene and butadiene obtained in Example 12.

The composition and randomness of the copolymer are analyzed in the following manner by the nuclear magnetic resonance spectrum. FIG. 1 is one embodiment of the nuclear magnetic resonance spectrum of the acetylenebutadiene copolymer of the present invention, which is measured in a deuterochloroform solution at 60 MHz and at room temperature by using tetramethylsilane as an internal standard. In the case when butadiene is bonded in 1,2-type, an absorption due to =CH₂ protons of —CH=CH₂ appears at 4.80–5.01δ. However, since this absorption does not substantially appear in the nuclear magnetic resonance spectrum of the copolymer of the present invention, the copolymer has substantially no 1,2-bond, and substantially all of the butadiene units are bonded in 1,4-type. Furthermore, since it has already been confirmed from the infrared absorpiton spectrum that almost all of the double bonds are present in cis-type in the copolymer, butadiene is copolymerized in cis-type. The nuclear magnetic resonance spectrum of the copolymer has four main absorptions, and the absorptions are assigned as shown in the following Table.

| Peak No. | δ-Value (ppm) | Assignment |
|---|---|---|
| 1 | 2.12 | —CH₂—CH₂—CH=CH— |
| 2 | 2.82 | —CH=CH—CH₂—CH=CH— |
| 3 | 5.40 | —CH₂—CH=CH—CH₂— |
| 4 | ~6.30 | —CH₂—CH=CH—CH=CH—CH₂— |

The peak at 2.12 δ is assigned to methylene protons of butadiene unit of the butadiene-butadiene diad, which are shown by H in the following formula.

The peak at 2.82δ is assigned to methylene protons of butadiene unit of the acetylene-butadiene sequence, which are shown by H in the following formula:

This peak shows that acetylene and butadiene are copolymerized.

The peak at 5.40 δ is assigned to methine protons of butadiene unit and those of acetylene unit isolated by butadiene units, which are shown by H in the following formulae:

and

The broad and very low peak at -6.30δ is assigned to methine protons of acetylene unit of the acetylene acetylene diad, which are shown by H in the following formula:

Since no peak is observed in a field lower than this peak, it can be seen that three or more acetylene sequence is substantially absent in the copolymer. That is, it can be seen that acetylene is not bonded to form blocks.

The molar fraction of acetylene unit in the copolymer can be calculated from the following formula:

$$A = 1 - (R/2)$$

In the formula,

A: molar fraction of acetylene unit in the copolymer $$R: \frac{(\text{area at } 2.12\delta) + (\text{area at } 2.82\delta)}{(\text{area at } 5.40\delta) + (\text{area at } 6.30\delta)}$$

Then, it can be determined by the diad fractions of monomer unit sequences whether the copolymer is random or block, said diad fractions being calculated from the following formulae:

$$F_{BB} = \frac{B}{1 + R'}$$

$$F_{AB} = 2R' \cdot F_{BB}$$
$$F_{AA} = 1 - (F_{AB} + F_{BB})$$

In the above formulae, $F_{BB}$: diad fraction of the butadiene-butadiene sequence,
$F_{AB}$: diad fraction of the acetylene-butadiene sequence,
$F_{AA}$: diad fraction of the acetylene-acetylene sequence,
B : molar fraction of butadiene unit in the copolymer, $$R': \frac{\text{area at } 2.82\delta}{\text{area at } 2.12\delta}$$

The diad fractions of the copolymer of the present invention calculated in this manner were substantially agreed with the following theoretical values when it was assumed that acetylene and butadiene were randomly copolymerized.

$$F_{BB} = B^2$$
$$F_{AB} = 2AB$$
$$F_{AA} = A^2$$

Therefore, it was found that the copolymer of the present invention was a random copolymer of acetylene and butadiene.

Furthermore, the block character P, which is used as one of the measures of the randomness, is shown by the following formula.

$$P = \frac{F_{AB} \text{ (from experimental value)}}{F_{AB} \text{ (from random assumption)}}$$

P being 1 means random copolymer,
P being << 1 means block copolymer, and
P being >> 1 means alternating copolymer.

The block character P of the acetylene-butadiene copolymer of the present invention is 1.2–0.8, and in most cases, 1.1–0.9, and near 1. This shows that the acetylenebutadiene copolymer of the present invention is a random copolymer.

The acetylene-butadiene random copolymer of the present invention gives no broad and low peak at 1.0–2.5δ assigned to cyclic methylene protons in the nuclear magnetic resonance spectrum. This shows that the copolymer does not contain cyclic structure portion.

The following examples are given for the purpose of illustration of this invention and are not intended as limitations thereof.

EXAMPLE 1

A Teflon-coated rotor of a magnetic stirrer was placed in a glass reaction vessel of 500 ml capacity equipped with a gas inlet and a three way stop-cock which was used for a gas outlet and nitrogen sealing, and air in the reaction vessel was replaced with nitrogen. Then, 3 mmoles of nickel naphthenate and 70 ml of dried toluene were charged into the reaction vessel, and while stirring the catalyst solution electromagnetically at 30°C, 15 mmoles of diethylaluminum chloride (2 moles/l hexane solution) was added dropwise thereto. After the catalyst was reacted at 30°C for 10 minutes while stirring, a gaseous mixture of acetylene and butadiene (the molar ratio of acetylene/butadiene was 23/77) was introduced into the catalyst solution at a flow rate of about 4.2 l/hr, whereby a polymerization reaction was effected at 30°C for 3 hours while stirring. All of the procedures in the charging of compounds and in the polymerization reaction were effected under a nitrogen atmosphere.

After completion of the polymerization reaction, the reaction mixture was poured into a large amount of methanol containing 2,6-di-tert-butyl-p-cresol as an antioxidant to obtain 24.9 g of a liquid rubbery product. The resulting rubbery product was dissolved in chloroform and the insoluble part was removed by filtration. Chloroform-soluble part weighed 22.9 g (92% based on the product) and was a light yellow liquid rubbery material.

It was confirmed from the nuclear magnetic resonance spectrum that the thus obtained rubbery material was a linear acetylene-butadiene copolymer containing 21.8 mol% of acetylene units. Further, the diad fractions of monomer units in the copolymer were found to be $F_{BB}=0.58$, $F_{AB}=0.39$ and $F_{AA}=0.03$. While, the theoretical values of the diad fractions in the case when the acetylene unit and the butadiene unit are randomly bonded are $F_{BB}=0.61$, $F_{AB}=0.34$ and $F_{AA}=0.05$. Therefore, the found value and the theoretical value are very close. Moreover, the above obtained copolymer had a block character P of 1.1. Accordingly, the copolymer is a random copolymer wherein acetylene and butadiene are randomly and linearly copolymerized.

It was found from the infrared absorption spectrum that the microstructure of the butadiene unit of the copolymer was composed of 89% of cis-1,4-bond, 8% of trans-1,4 bond and 3% of 1,2-bond.

EXAMPLE 2

A polymerization reaction was effected at 20°C for 3 hours in the same manner as described in Example 1, except that the catalyst was reacted at 25°C for 10 minutes, to obtain 12.0 g of a liquid rubbery product. Chloroformsoluble part in this rubbery product weighed 9.0 g (75% based on the product) and was a light yellow liquid rubbery material.

It was confirmed from the nuclear magnetic resonance spectrum that the thus obtained rubbery material was a linear acetylene-butadiene copolymer containing 29.6 mol% of acetylene units. Further, the diad fractions of monomer unit sequences in the copolymer were found to be $F_{BB}=0.52$, $F_{AB}=0.38$ and $F_{AA}=0.10$. While, the theoretical values of the diad fractions in the case when the acetylene unit and the butadiene unit are randomly bonded are $F_{BB}=0.49$, $F_{AB}=0.42$ and $F_{AA}=0.09$. Therefore, the found value and the theoretical value are very close. Moreover, the above obtained copolymer had a block character P of 0.9. Therefore, the copolymer is a copolymer, wherein acetylene and butadiene are randomly and linearly copolymerized.

It was found from the infrared absorption spectrum that the microstructure of the butadiene unit was composed of 86% of cis-1,4 bond, 9% of trans-1,4 bond and 5% of 1,2-bond.

The copolymer had an intrinsic viscosity [$\eta$] of 0.12 in toluene at 30°C.

Comparative EXAMPLE 1

A polymerization reaction was effected in the same manner as described in Example 2, except that 3 mmoles of titanium tetrachloride was used instead of nickel naphthenate and 15 mmoles of triethylaluminum was used instead of diethylaluminum chloride, to obtain 1.48 g of a black powdery product. Chloroform-insoluble part in this product weighed 1.04 g (70% based on the product) and was a black powdery material. Since the chloroform-insoluble part was a black powdery material and had a strong absorption at 1,010 $cm^{-1}$ of the infrared absorption spectrum, it was found that the chloroform-insoluble part had long conjugated trans-type double bond sequences. Accordingly, the black powdery material was a polymer wherein acetylene units were bonded in trans-type in a block form.

Chloroform-soluble part in the above obtained powdery product weighed 0.44 g (30% based on the product). A wide and low peak was observed at 1.0–2.5$\delta$ of the nuclear magnetic resonance spectrum of the chloroform-soluble part and therefore it was found that the chloroform-soluble part was a polymer having a very large amount of cyclic structure portions.

As described above, it can be seen that when the triethylaluminum-titanium tetrachloride catalyst is used, a black powdery polymer having acetylene block bonds is predominantly produced, and a small amount of a highly cyclized polymer is produced.

Comparative EXAMPLE 2

A polymerization reaction was effected in the same manner as described in Example 2, except that 3 mmoles of vanadyl trichloride was used instead of nickel naphthenate and 15 mmoles of triethylaluminum was used instead of diethylaluminum chloride, to obtain 1.35 g of a black powdery product. Chloroform-insoluble part in this product weighed 1.26 g (93% based on the product) and was a black powdery material. Since the chloroform-insoluble part was a black powdery material and had a strong absorption at 1,010 $cm^{-1}$ in the infrared absorption spectrum, it was found that the chloroform-insoluble part had long conjugated trans-type double bond sequences. Therefore, the black powdery material was a polymer wherein acetylene units were bonded in trans-type in a block form. Chloroform-soluble part in the above obtained product weighed only 0.09 g (7% based on the product). The chloroform-soluble part gave a nuclear magnetic resonance spectrum having a broad and low peak at 1.0–2.5$\delta$, and therefore the chloroform-soluble part was a polymer having a large amount of cyclic structure portions.

As described above, it can be seen that when the triethylaluminum-vanadyl trichloride catalyst is used, a black powdery polymer having acetylene block bonds is predominantly produced.

Comparative EXAMPLE 3

A polymerization reaction was effected in the same manner as described in Example 2, except that 3 mmoles of nickel chloride was used instead of nickel naphthenate and 15 mmoles of triethylaluminum was used instead of diethylaluminum chloride, to obtain 2.60 g of a dark brown powdery product. Chloroform-insoluble part in this product weighed 2.21 g (85% based on the product) and was a dark brown powdery material. From the fact that the chloroform-insoluble part was a dark brown powdery material, it was found that the main product of this polymerization reaction was a polymer having acetylene blocks. While, chloroform-soluble part in the above obtained product weighed 0.39 g (15% based on the product). The chloroform-soluble part gave a nuclear magnetic resonance spectrum having a broad and low peak at 1.0–2.5$\delta$, and therefore the chloroform-soluble part was a polymer having a very large amount of cyclic structure portions.

As described above, it can be seen that when the triethylaluminum-nickel chloride catalyst is used, a dark brown powdery polymer having acetylene block bonds is predominantly produced.

Comparative EXAMPLE 4

A polymerization reaction was effected in the same manner as described in Example 2, except that 3 mmoles of titanium tetrachloride was used instead of nickel naphthenate and 15 mmoles of ethylaluminum sesquichloride was used instead of diethylaluminum chloride, to obtain 22.7 g of a rubbery product. Chloroform-soluble part in this product weighed 21.6 g (95% based on the product). The nuclear magnetic resonance spectrum of the chloroform-soluble part was agreed with that of a cation polymerization polybutadiene having a large amount of cyclic structure portions, which was obtained by a polymerization of butadiene alone by using ethylaluminum dichloride alone as a catalyst. Moroever, there is no peak at 2.82$\delta$ in the spectrum, and therefore it was confirmed that the chloroform-soluble part was a homopolymer of butadiene. While, chloroform-insoluble part was black powdery material and was a polymer wherein acetylene units were bonded in blocks.

As described above, it can be seen that when the ethylaluminum sesquichloride-titanium tetrachloride catalyst is used, a cation polymerization butadiene homopolymer is produced as a main product.

Comparative EXAMPLE 5

A polymerization reaction was effected in the same manner as described in Example 2, except that 15 mmoles of triethylaluminum was used instead of diethylaluminum chloride, to obtain 3.50 g of a black powdery product. Chloroform-insoluble part in this product weighed 2.34 g (95% based on the product). From the fact that the chloroform-insoluble part was a black powdery material, it was found that the main product of this polymerization reaction was a polymer wherein acetylene units were bonded in blocks. While, it was found from the nuclear magnetic resonance spectrum that chloroform-soluble part in the above obtained product was a polymer having a very large amount of cyclic structure portions.

As described above, it can be seen that when the triethylaluminum-nickel naphthenate catalyst is used, a polymer having acetylene blocks is produced as a main product.

Comparative EXAMPLES 6–9

Polymerization reactions were effected in the same manner as described in Example 2, except that 3 mmoles of each of nickel fluoride, nickel chloride, nickel bromide or nickel iodide was used instead of nickel naphthenate. When nickel fluoride or nickel bromide was used, substantially no polymer was obtained. When nickel chloride was used, 0.27 g of a reaction product was obtained. The product was substantially completely soluble in chloroform. The nuclear magnetic resonance spectrum of the product showed that the product was a polymer having a very large amount of cyclic structure portions, which was similar to the cation polymerization polybutadiene described in Comparative Example 4. When nickel iodide was used, 0.34 g of a reaction product was obtained. Chloroform-soluble part in the product weighed 0.18 g (52.9% based on the product). It was found from the nuclear magnetic resonance spectrum that the chloroform-soluble part in the product was a polymer having a very large amount of cyclic structure portions, which was similar to the cation polymerization polybutadiene described in Comparative Example 4, and acetylene was not copolymerized.

As described above, it can be seen that when the diethylaluminum chloride-nickel halide catalyst is used, only a small amount of a polymer similar to the cation polymerization polybutadiene having a very large amount of cyclic structure portions is produced.

EXAMPLE 3

A polymerization reaction was effected in the same manner as described in Example 2, except that 15 mmoles of di-n-propylaluminum chloride was used instead of diethylaluminum chloride, to obtain 9.8 g of a liquid rubbery product. Chloroform-soluble part in this product weighed 7.6 g (78% based on the product) and was a light yellow liquid rubbery material. It was confirmed from the nuclear magnetic resonance spectrum that the resulting rubbery material was a copolymer containing 20.0 mol% of acetylene units, wherein the acetylene unit and the butadiene unit were bonded randomly and linearly. Moreover, the copolymer had a block character P of 1.0. It was found from the infrared absorption spectrum that the microstructure of the butadiene unit was composed of 85% of cis-1,4 bond, 10% of trans-1,4 bond and 5% of 1,2-bond.

EXAMPLE 4

A polymerization reaction was effected in the same manner as described in Example 2, except that 15 mmoles of di-iso-butylaluminum chloride was used instead of diethylaluminum chloride, to obtain 7.9 g of a liquid rubbery product. Chloroform-soluble part in this product weighed 6.6 g (83% based on the product) and was a light yellow liquid rubbery material. It was confirmed from the nuclear magnetic resonance spectrum that the resulting rubbery material was a copolymer containing 25.2 mol% of acetylene units, wherein the acetylene unit and the butadiene unit were bonded randomly and linearly. Moroever, the copolymer had a block character P of 1.0. It was found from the infrared absorption spectrum that the microstructure of the butadiene unit was composed of 82% of cis-1,4 bond, 11% of trans-1,4 bond and 7% of 1,2-bond.

EXAMPLE 5

A polymerization reaction was effected in the same manner as described in Example 2, except that 5 mmoles of di-iso-butylaluminum chloride and 10 mmoles of diethylaluminum chloride were used instead of 15 mmoles of diethyl-aluminum chloride, to obtain 8.5 g of a liquid rubbery product. Chloroform-soluble part in this product weighed 7.6 g (89% based on the product) and was a light yellow liquid rubbery material. It was confirmed from the nuclear magnetic resonance spectrum that the resulting rubbery material was a copolymer containing 18.2 mol% of acetylene units, wherein the acetylene unit and the butadiene unit were bonded randomly and linearly. It was found from the infrared absorption spectrum that the microstructure of the butadiene unit was composed of 85% of cis-1,4 bond, 9% of trans-1,4 bond and 6% of 1,2-bond.

EXAMPLE 6

A polymerization reaction was effected in the same manner as described in Example 2. However, in this Example 6, triethylaluminum and aluminum chloride were reacted in the following manner, and the reaction mixture was directly used in an amount of 15 mmoles, calculated as aluminum, instead of diethylaluminum chloride.

Into a glass flask were charged 20 mmoles of aluminum chloride and 40 ml of hexane, and after the system was cooled to 0°C, 20 ml of a 2 moles/l solution of triethylaluminum in hexane was added gradually and dropwise to the system while stirring. After generation of heat was ceased, the catalyst system was left to stand for one night at 20°C while stirring. The above procedures were effected under a nitrogen atmosphere. The thus obtained reaction mixture of triethylaluminum and aluminum chloride had substantially the same molecular formula, $(C_2H_5)_2AlCl$, as that of diethylaluminum chloride.

As the result of the polymerization reaction, 10.0 g of a liquid rubbery product was obtained. Chloroform-soluble part in this product weighed 8.2 g (82% based on the product) and was a light yellow liquid rubbery material. It was confirmed from the nuclear magnetic resonance spectrum that the resulting rubbery material was a copolymer containing 30.1 mol% of acetylene units, wherein the acetylene and the butadiene unit were bonded randomly and linarly. It was found from the infrared absorption spectrum that the microstructure of the butadiene unit was composed of 86% of cis-1,4 bond, 10% of trans-1,4 bond and 4% of 1,2-bond.

EXAMPLE 7

A polymerization reaction was effected in the same manner as described in Example 2, except that 3 mmoles of nickel formate was used instead of nickel naphthenate, to obtain 16.4 g of a liquid rubbery product. Chloroform-soluble part in this product weighed 15.1 g (92% based on the product) and was a light yellow liquid rubbery material.

It was confirmed from the nuclear magnetic resonance spectrum that the resulting rubbery material was a copolymer containing 11.0 mol% of acetylene units, wherein the acetylene unit and the butadiene unit were bonded randomly and linearly. It was found from the infrared absorption spectrum that the microstructure of the butadiene unit was composed of 85% of cis-1,4 bond, 9% of trans-1,4 bond and 6% of 1,2-bond.

EXAMPLE 8

A polymerization reaction was effected in the same manner as described in Example 2, except that 3 mmoles of nickel benzoate trihydrate was used instead of nickel naphthenate, to obtain 5.50 g of a liquid rubbery product. Chloroform-soluble part in this product weighed 4.40 g (80% based on the product) and was a light yellow liquid rubbery material. It was confirmed from the nuclear magnetic resonance spectrum that the resulting rubbery material was a copolymer containing 29.1 mol% of acetylene units, wherein the acetylene unit and the butadiene unit were bonded randomly and linearly. It was found from the infrared absorption spectrum that the microstructure of the butadiene unit was composed of 85% of cis-1,4 bond, 8% of trans-1,4 bond and 7% of 1,2-bond.

EXAMPLE 9

A polymerization reaction was effected in the same manner as described in Example 2, except that 3 mmoles of nickel cyclohexylbutyrate $(C_6H_{11}(CH_2)_3COO)_2Ni$ was used instead of nickel naphthenate, to obtain 6.24 g of a liquid rubbery product. Chloroform-soluble part in this product weighed 5.43 g (87% based on the product). It was confirmed from the nuclear magnetic resonance spectrum that the chloroform-soluble rubbery material was a copolymer containing 28.0 mol% of acetylene units, wherein the acetylene unit and the butadiene unit were bonded randomly and linearly. It was found from the infrared absorption spectrum that the microstructure of the butadiene unit was composed of 86% of cis-1,4 bond, 8% of trans-1,4 bond and 6% of 1,2-bond.

EXAMPLE 10

A polymerization reaction was effected in the same manner as described in Example 2, except that 3 mmoles of nickel diacetylacetonate was used instead of nickel naphthenate, to obtain 2.83 g of a liquid rubbery product. Chloroformsoluble part in this product weighed 2.69 g (95% based on the product). It was confirmed from the nuclear magnetic resonance spectrum that the chloroform-soluble rubbery material was a copolymer containing 18.1 mol% of acetylene units, wherein the acetylene unit and the butadiene unit were bonded randomly and linearly. It was found from the infrared absorption spectrum that the microstructure of the butadiene unit was composed of 86% of cis-1,4 bond, 10% of trans-1,4 bond and 4% of 1,2-bond.

EXAMPLE 11

A polymerization reaction was effected in the same manner as described in Example 2, except that a mixture of 1 mmole of nickel diacetylacetonate and 2 mmoles of nickel naphthenate was used instead of nickel naphthenate, to obtain 8.2 g of a liquid rubbery product. Chloroform-soluble part in this product weighed 7.6 g (93% based on the product) and was a light yellow liquid rubbery material. It was confirmed from the nuclear magnetic resonance spectrum that the chloroform-soluble rubbery material was a copolymer containing 30.4 mol% of acetylene units, wherein the acetylene unit and the butadiene unit were bonded randomly and linearly. It was found from the infrared absorption spectrum that the microstructure of the butadiene unit was composed of 87% of cis-1,4 bond, 8% of trans-1,4 bond and 5% of 1,2-bond.

EXAMPLE 12

A polymerization reaction was effected in the same manner as described in Example 2, except that the reaction of nickel naphthenate and diethylaluminum chloride was effected at 30°C for 20 minutes, to obtain 7.35 g of a liquid rubbery product. Chloroform-soluble part in this product weighed 5.29 g (72% based on the product). It was confirmed from the nuclear magnetic resonance spectrum that the chloroform-soluble rubbery material was a copolymer containing 38.2 mol% of acetylene units, wherein the acetylene unit and the butadiene unit were bonded randomly and linearly. It was found from the infrared absorption spectrum that the microstructure of the butadiene unit was composed of 81% of cis-1,4 bond, 11% of trans-1,4 bond and 8% of 1,2-bond.

EXAMPLE 13

A polymerization reaction was effected in the same manner as described in Example 2, except that the reaction of nickel naphthenate and diethylaluminum chloride was effected at 40°C for 10 minutes, to obtain 3.40 g of a liquid rubbery product. Chloroform-soluble part in this product weighed 2.38 g (70% based on the product). It was confirmed from the nuclear magnetic resonance spectrum that the chloroform-soluble rubbery material was a copolymer containing 49.0 mol% of acetylene units, wherein the acetylene unit and the butadiene unit were bonded randomly and linearly. It was found from the infrared absorption spectrum that the microstructure of the butadiene unit was composed of 80% of cis-1,4 bond, 12% of trans-1,4 bond and 8% of 1,2-bond.

EXAMPLE 14

The same reaction vessel as described in Example 1 was used, and after air in the reaction vessel was replaced with nitrogen, 3 mmoles of nickel naphthenate and 70 ml of dried toluene were charged into the reaction vessel, and the catalyst solution was heated to 60°C. Then, a gaseous mixture of acetylene and butadiene (molar ratio of acetylene/butadiene = 23/77) was introduced into the solution at a flow rate of about 4.2 l/hr, and after 10 minutes, 15 mmoles of diethylaluminum chloride was added dropwise to the solution while introducing the gaseous mixture of the monomers at the same flow rate and stirring the reaction system, after which the introduction of the gaseous mixture and the stirring were further continued at 60°C for 3 hours to effect a polymerization reaction. All of the procedures in the charging of compounds and in the polymerization reaction were effected under a nitrogen atmosphere. After completion of the polymerization reaction, the reaction mixture was poured into a large amount of methanol containing 2,6-di-tert-butyl-p-cresol as an antioxidant to obtain 12.7 g of a liquid rubbery product. Chloroform-soluble part in this product was 10.7 g (84% based on the product) and was a light yellow liquid rubbery material. It was confirmed from the nuclear magnetic resonance spectrum that the chloroform-soluble rubbery material was a copolymer containing 27.0 mol% of acetylene units, wherein the acetylene unit and the butadiene unit were bonded randomly and linearly. It was found from the infrared absorption spectrum that the microstructure of the butadiene unit was composed of 85% of cis-1,4 bond, 10% of trans-1,4 bond and 5% of 1,2-bond.

EXAMPLE 15

A polymerization reaction was effected in the same manner as described in Example 14, except that the reaction of the catalyst and the polymerization reaction were effected at 20°C. and a gaseous mixture of acetylene and butadiene (molar ratio of acetylene/butadiene = 50/50) was introduced at a flow rate of about 2.4 l/hr, to obtain 12.0 g of a liquid rubbery product. Chloroform-soluble part in this product weighed 8.9 g (74% based on the product). It was confirmed from the nuclear magnetic resonance spectrum that the chloroform-soluble rubbery material was a copolymer containing 37.0 mol% of acetylene units, wherein the acetylene unit and the butadiene unit were bonded randomly and linearly. It was found from the infrared absorption spectrum that the microstructure of the butadiene unit was composed of 84% of cis-1,4 bond, 11% of trans-1,4 bond and 5% of 1,2-bond.

EXAMPLE 16

A polymerization reaction was effected in the same manner as described in Example 2, except that 45 mmoles of diethylaluminum chloride was used, to obtain 6.10 g of a liquid rubbery product. Chloroform-soluble part in this product weighed 4.58 g (75% based on the product). It was confirmed from the nuclear magnetic resonance spectrum that the chloroform-soluble rubbery material was a copolymer containing 22.9 mol% of acetylene units, wherein the acetylene unit and the butadiene unit were bonded randomly and linearaly. It was found from the infrared absorption spectrum that the microstructure of the butadiene unit was composed of 88% of cis-1,4 bond, 9% of trans-1,4 bond and 3% of 1,2-bond.

EXAMPLE 17

A polymerization reaction was effected in the same manner as described in Example 2, except that 70 ml of 1,2-dichloroethane was used instead of the solvent toluene, to obtain 8.80 g of a liquid rubbery product. Chloroform-soluble part in this product weighed 6.42 g (73% based on the product). It was confirmed from the nuclear magnetic resonance spectrum that the chloroform-soluble rubbery material was a copolymer containing 35.7 mol% of acetylene units, wherein the acetylene unit and the butadiene unit were bonded randomly and linearly. It was found from the infrared absorption spectrum that the microstructure of the butadiene unit was composed of 83% of cis-1,4 bond, 10% of trans-1,4 bond and 7% of 1,2-bond. The copolymer had an intrinsic viscosity [$\eta$] of 0.11 in toluene at 30°C.

EXAMPLE 18

A polymerization reaction was effected in the same manner as described in Example 2, except that 70 ml of xylene was used instead of solvent toluene, to obtain 11.0 g of a liquid rubbery product. Chloroform-soluble part in this product weighed 7.7 g (70% based on the product). It was confirmed from the nuclear magnetic resonance spectrum that the chloroform-soluble rubbery material was a copolymer containing 25.0 mol% of acetylene units, wherein the acetylene unit and the butadiene unit were bonded randomly and linearly. It was found from the infrared absorption spectrum that the microstructure of the butadiene unit was composed of 85% of cis-1,4 bond, 9% of trans-1,4 bond and 6% of 1,2-bond.

EXAMPLE 19

A polymerization reaction was effected in the same manner as described in Example 2, except that 1 mmole of nickel naphthenate and 20 mmoles of diethylaluminum chloride were used, to obtain 1.64 g of a liquid rubbery product. Chloroform-soluble part in this product weighed 1.32 g (81% based on the product) and was a light yellow liquid rubbery material. It was confirmed from the nuclear magnetic resonance spectrum that the chloroform-soluble rubbery material was a copolymer containing 31.4 mol% of acetylene units, wherein the acetylene unit and the butadiene unit were bonded randomly and linearly. It was found from the infrared absorption spectrum that the microstructure of the butadiene unit was composed of 84% of cis-1,4 bond, 10% of trans-1,4 bond and 6% of 1,2-bond.

EXAMPLE 20

A polymerization reaction was effected in the same manner as described in Example 2, except that 0.5 mmole of nickel diacetylacetonate and 10 mmoles of diethylaluminum chloride were used as a catalyst, to obtain 0.50 g of a liquid rubbery product. The amount of chloroform-soluble part in this product was 70% based on the product. It was confirmed from the nuclear magnetic resonance spectrum that the chloroform-soluble rubbery material was a copolymer containing 17.7 mol% of acetylene units, wherein the acetylene unit and the butadiene unit were bonded randomly and linearly. It was found from the infrared absorption spectrum that the microstructure of the butadiene unit was composed of 85% of cis-1,4 bond, 10% of trans-1,4 bond and 5% of 1,2-bond.

EXAMPLE 21

A Teflon-coated rotor of a magnetic stirrer was placed in a glass reaction vessel of 1 l capacity equipped with a gas inlet and a three way stop-cock which was used for a gas outlet and nitrogen sealing, and air in the reaction vessel was replaced with nitrogen. Then, 15 mmoles of nickel naphthenate (0.5 mole/l hexane solution) and 350 ml of dried toluene were charged into the reaction vessel, and while stirring the catalyst solution electromagnetically at 30°C, 75 mmoles of diethylaluminum chloride (2 moles/l hexane solution) was added dropwise thereto. After the catalyst was reacted at 30°C for 10 minutes while stirring, a gaseous mixture of acetylene and butadiene (molar ratio of acetylene/butadiene = 19/81) was introduced into the catalyst solution at a flow rate of about 24.6 l/hr, whereby a polymerization reaction was effected at 30°C for 4 hours while stirring. All of the procedures in the charging of compounds and in the polymerization reaction were effected under a nitrogen atmosphere. After completion of the polymerization reaction, the reaction mixture was poured into a large amount of methanol to obtain 130 g of a liquid rubbery product. The amount of chloroform-soluble part in this product was 80% based on the product.

It was confirmed from the nuclear magnetic resonance spectrum that the chloroform-soluble rubbery material was a copolymer containing 17.6 mol% of acetylene units, wherein the acetylene unit and the butadiene unit were bonded randomly and linearly. It was found from the infrared absorption spectrum that the microstructure of the butadiene unit was composed of 86% of cis-1,4 bond, 99% of trans-1,4 bond and 5% of 1,2-bond. The number average molecular weight of the copolymer measured by means of a vapor pressure osmometer was 2,400.

EXAMPLE 22

A polymerization reaction was effected in the same manner as described in Example 21, except that a gaseous mixture of acetylene and butadiene (molar ratio of acetylene/butadiene was 34/66) was introduced at a flow rate of 16.9 l/hr, to obtain 81 g of a liquid rubbery product. The amount of chloroform-soluble part in this product was 85% based on the product. It was confirmed from the nuclear magnetic resonance spectrum that the chloroform-soluble rubbery material was a copolymer containing 32.2 mol% of acetylene units, wherein the acetylene unit and the butadiene unit were bonded randomly and linearly. It was found from the infrared absorption spectrum that the microstructure of the butadiene unit was composed of 87% of cis-1,4 bond, 7% of trans-1,4 bond and 6% of 1,2-bond. The number average molecular weight of the copolymer was 2,000.

EXAMPLE 23

A Teflon-coated rotor was placed in a glas reaction vessel of 500 ml capacity provided with a gas inlet and a three way stop-cock which was used for a gas outlet and nitrogen sealing, and air in the reaction vessel was replaced with nitrogen. Then, 3 mmoles of nickel naphthenate and 70 ml of dried toluene were charged into the reaction vessel, and while stirring electromagnetically the catalyst solution at 30°C, 15 mmoles of diethylaluminum chloride (2 mol/l hexane solution) was added dropwise thereto. After the catalyst was reacted at 30°C for 10 minutes while stirring, 0.39 mole of isoprene was charged into the reaction vessel, and then acetylene gas was introduced into the reaction solution at a rate of 0.039 mol/hr, whereby a polymerization reaction was effected at 30°C for 3 hours. All of the procedures in the charging of compounds and in the polymerization reaction were effected under a nitrogen atmosphere.

After completion of the polymerization reaction, the reaction mixture was poured into a large amount of methanol containing 2,6-di-tert-butyl-p-cresol as an antioxidant to obtain 11.80 g of a liquid rubbery product. The resulting product was dissolved in chloroform and insoluble part was removed by filtration. Chloroform-soluble part weighed 9.5 g (81% based on the product) and was a viscous liquid rubbery copolymer. The copolymer had an intrinsic viscosity $[\eta]$ of 0.10 in toluene at 30°C.

The structure, composition and randomness of the resulting copolymer were analyzed by means of a nuclear magnetic resonance spectrum.

Figure 2:
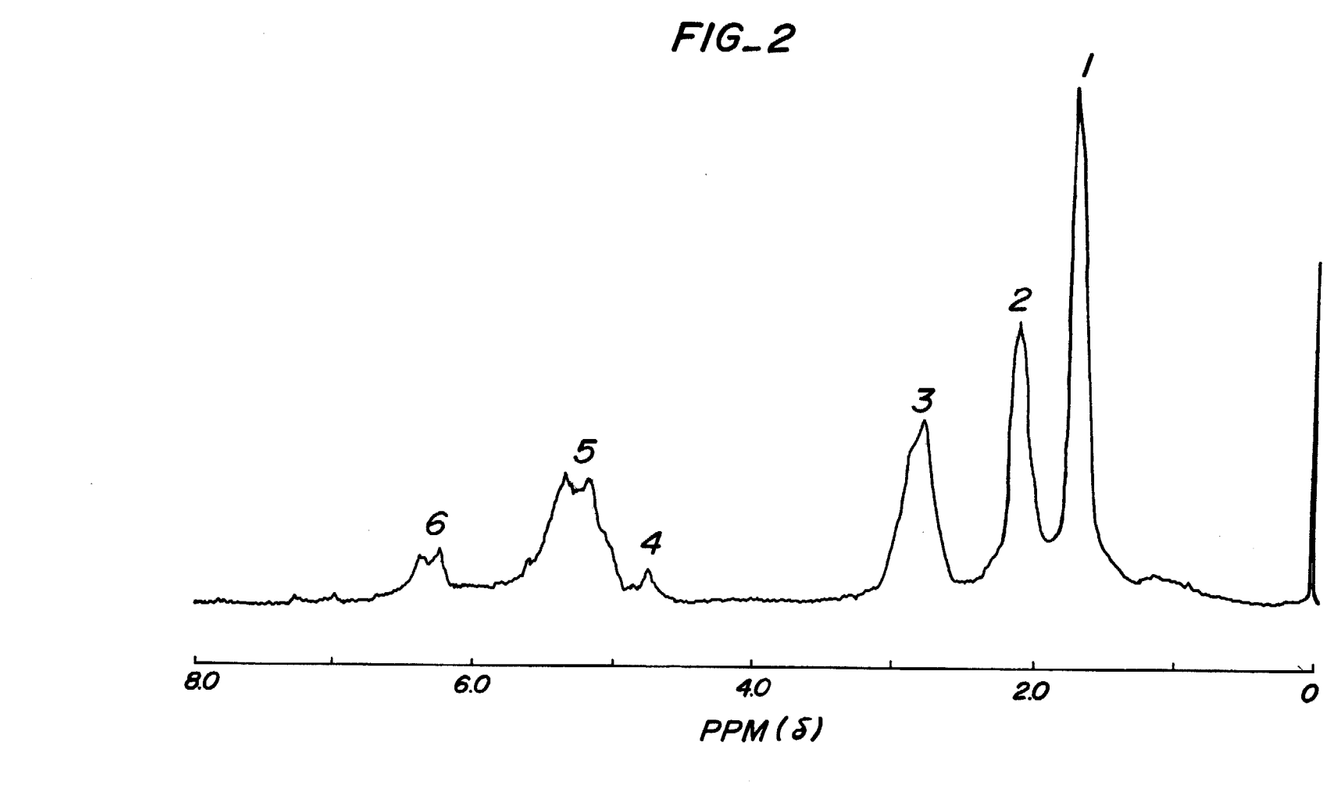
FIG. 2 is the nuclear magnetic resonance spectrum of the linear random copolymer of acetylene and isoprene obtained in Example 23.

FIG. 2 shows the nuclear magnetic resonance spectrum of the resulting copolymer, which was measured in a solution of the copolymer in deuterochloroform at 60 MHz and at room temperature by using tetramethylsilane as an internal standard.

The peak 1 at 1.68 δ is assigned to methyl protons of cis-1,4 type isoprene unit, which are shown by H in the following formula:

The peak 2 at 2.06 δ is assigned to methylene protons of isoprene unit of the isoprene-isoprene diad, which are shown by H in the following formula:

The peak 3 at ~2.78δ is assigned to diallyl type methylene protons, i.e., methylene protons of isoprene unit of the acetylene-isoprene sequence, which are shown by H in the following formulae:

and

The small peak 4 at 4.73 δ is assigned to methylene protons of 3,4-type isoprene unit, which are shown by H in the following formula:

Peaks assigned to other protons than the methylene protons of the 3,4-type isoprene unit and the above described peaks 1 and 2 overlap each other.

The broad peak at ~5.25δ is assigned to methine protons of 1,4-type isoprene unit and those of acetylene unit isolated by isoprene units, which are shown by H in the following formulae:

and

The broad peak at ~6.30δ is assigned to methine protons of acetylene unit of the acetylene-acetylene diad, which are shown by H in the following formula:

Since substantially no peak is observed at a field lower than the field of this peak, it can been seen that three or more acetylene sequence is substantially absent inn the copolymer.

It was found from the nuclear magnetic resonance spectrum that the copolymer contained 43.9 mol% of acetyelen units. Further, the microstructure of isoprene unit of the copolymer was composed of 92.9% of cis-1,4 bond, 7.1% of 3,4-bond, ~0% of 1,2-bond and ~0% of trans-1,4 bond.

The diad fractions of the monomer unit sequences in the copolymer, which are used as a measure of the randomness, were found to be as follows:

$F_{II} = 0.314$ $F_{IA} = 0.495$
$F_{AA} = 0.191$

In the above formulae, $F_{II}$ is diad fraction of the isoprene-isoprene sequence.

$F_{IA}$ is diad fraction of the isoprene-acetylene sequence, and $F_{AA}$ is diad fraction of the acetylene-acetylene sequence.

While, when it is assumed that isoprene and acetylene were randomly copolymerized, the theoretical values of the diad fractions are as follows:

$F_{II} = 0.315$
$F_{IA} = 0.493$
$F_{AA} = 0.192$

Therefore, the found values of diad fractions are close to the theoretical values. Furthermore, the copolymer had a block character P of 1.0.

It was found from the above described analysis that the above obtained copolyemr was a copolymer wherein the isoprene unit and the acetylene unit were bonded randomly and linearly.

Comparative EXAMPLE 10

A polymerization reaction was effected in the same manner as described in Example 23, except that 3 mmoles of titanium tetrachloride was used instead of nickel naphthenate and 15 mmoles of triethylaluminum was used instead of diethylaluminum chloride, to obtain 1.57 g of a black powdery product. Chloroform-insoluble part in this product weighed 1.10 g (70% based on the product). The chloroform-insoluble part was a black powdery material and had a strong absorption at 1,010 cm$^{-1}$ in the infrared absorption spectrum. Therefore, it was found that the chloroform-insoluble black powdery material had long conjugated trans-type double bond sequences. That is, the black powdery material was a polymer wherein acetylene units were bonded in trans-type in a block form.

Chloroform-soluble part in the above obtained product weighed 0.47 g (30% based on the product). The nuclear magnetic resonance spectrum of the chloroform-soluble part had a broad and low peak at 1.0–2.5δ, and therefore it was found that the chloroform-soluble part was a polymer having a very large amount of cyclic structure portions.

As described above, it can be seen that when the triethylaluminum-titanium tetrachloride catalyst is used, a black powdery polymer having acetylene block bonds is predominantly produced, and a small amount of a highly cyclized polymer is produced.

Comparative EXAMPLE 11

A polymerization reaction was effected in the same manner as described in Example 23, except that 3 mmoles of vanadyl trichloride was used instead of nickel naphthenate and 15 mmoles of triethylaluminum was used instead of diethylaluminum chloride, to obtain 1.68 g of a black powdery product. Chloroform-insoluble part part in this product weighed 1.58 g (94% based on the product) and was a black powdery material. Since the chloroform-insoluble part was a black powdery material and had a strong absorption at 1,010 cm$^{-1}$ in the intrared absorption spectrum, it was found that the chloroform-insoluble part had long conjugated double bond sequences. Therefore, the black powdery material is a polymer wherein acetylene units are bonded in trans-type in block form.

Chloroform-soluble part in the above obtained product had a broad and low peak at 1.0–2.5δ in the nuclear magnetic resonance spectrum, and therefore the chloroform-soluble part was a polymer having a very large amount of cyclic structure portions.

As described above, it can be seen that when the triethylaluminum-vanadyl trichloride catalyst is used, a black powdery polymer having acetylene block bond is predominantly produced.

Comparative EXAMPLE 12

A polymerization reaction was effected in the same manner as described in Example 23, except that 3 mmoles of nickel chloride was used instead of nickel naphthenate and 15 mmoles of triethylaluminum was used instead of diethylaluminum chloride, to obtain 1.47 g of a dark brown powdery product. Chloroform-insoluble part in this product weighed 1.25 g (85% based on the product). Since the chloroform-insoluble part was a dark brown powdery material, it was found that the chloroform-insoluble part was a polymer having acetylene blocks. Chloroform-soluble part in the above obtained product weighed 0.22 g (15% based on the product). The chloroform-soluble part had a broad and low peak at 1.0–2.5δ in the nuclear magnetic resonance spectrum, and therefore it was found that the chloroform-soluble part was polymer having a very large amount of cyclic structure portions.

As described above, it can be seen that when the triethylaluminum-nickel chloride catalyst is used, a dark brown powdery polymer having acetylene block bonds is predominantly produced.

Comparative EXAMPLE 13

A polymerization reaction was effected in the same manner as described in Example 23, except that 3 mmoles of titanium tetrachloride was used instead of nickel naphthenate and 15 mmoles of ethylaluminum sesquichloride was used instead of diethylaluminum chloride, to obtain 27.66 g of a reaction product. The amount of chloroform-soluble part in the product was 5.82 g (21.0% based on the product). The nuclear magnetic resonance spectrum of the chloroform-soluble part was agreed with that of a cyclized polyisoprene having a large amount of cyclic structure portions, which was obtained by polymerizing isoprene alone. Moroever, the chloroform-soluble part had no peak at ~2.78δ in the nuclear magnetic resonance spectrum. Therefore, it was confirmed that the chloroform-soluble part was an isoprene homopolymer. Chloroform-insoluble part gave substantially the same infrared absorption spectrum as that of the chloroform-soluble part. Therefore, the chloroform-insoluble part is probably a gelled compound of a cyclized polyiosprene, which is similar to the chloroform-soluble part.

As described above, it can be seen that when the ethylaluminum sesquichloride-titanium tetrachloride catalyst is used, a cyclized isoprene homopolymer is produced.

EXAMPLE 24

A polymerization reaction was effected in the same manner as described in Example 23, except that 0.39 mole of 2,3-dimethylbutadiene was used instead of isoprene, to obtain 5.33 g of a rubbery product. Chloroform-soluble part in this product weighed 4.17 g (78.2% based on the product). The chloroform-soluble copolymer had an intrinsic viscosity [η] of 0.12 in toluene at 30°C.

Figure 3:
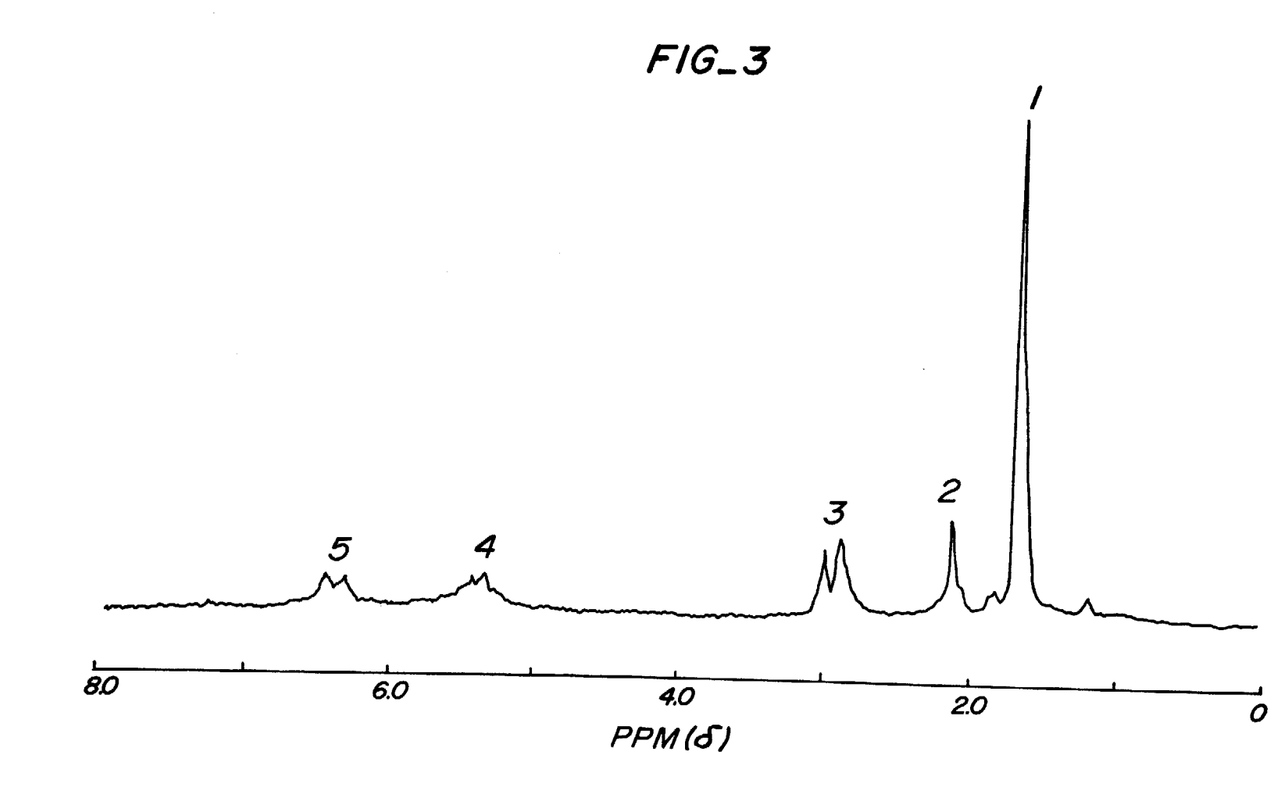
FIG. 3 is the nuclear magnetic resonance spectrum of the linear random copolymer of acetylene and 2,3-dimethylbutadiene obtained in Example 24.

FIG. 3 shows the nuclear magnetic resonance spectrum of the resulting copolymer, which was measured in a solution of the copolymer in deuterochloroform at 60 MHz and at room temperature by using tetramethylsilane as an internal standard.

The peak 1 at 1.66δ is assigned to methyl protons of trans-1,4 type dimethylbutadiene unit, which are shown by H in the following formula:

The peak 2 at 2.12δ is assigned to methylene protons of dimethylbutadiene unit of the dimethylbutadiene-dimethylbutadiene diad, which are shown by H in the following formula:

The peak 3 at ~2.93δ, which is divided into two peaks, is assigned to diallyl type methylene protons, i.e., methylene protons of dimethylbutadiene unit of the acetylene-dimethyl-butadiene sequence, which are shown by H in the following formula:

The broad peak 4 at ~5.35δ is assigned to methine protons of acetylene unit isolated by dimethylbutadiene units, which are shown by H in the following formula:

The broad peak 5 at ~6.40δ is assigned to methine protons of acetylene unit of the acetylene-acetylene diad, which are shown by H in the following formula:

Since substantially no peak is observed at a field lower than the field of this peak, it can be seen that three or more acetylene sequence is substantially absent in the copolymer.

It was found from the nuclear magnetic resonance spectrum that the copolymer contained 62.3 mol% of acetylene units. Further, in the copolymer, substantially all the dimethylbutadiene units were bonded in trans-1,4 type, and 1,2-bond was substantially absent.

The diad fractions of the monomer unit sequences in the copolymer, which are used as a measure of the randomness, were found to be as follows.

$F_{DD} = 0.159$
$F_{DA} = 0.436$
$F_{AA} = 0.405$

In the above formulae, $F_{DD}$ is diad fraction of the dimethylbutadiene-dimethylbutadiene sequence, $F_{DA}$ is diad fraction of the dimethylbutadiene-acetylene sequence, and $F_{AA}$ is diad fraction of the acetylene-acetylene sequence.

While, when it is assumed that dimethylbutadiene and acetylene were randomly copolymerized, the theoretical values of the diad fractions are as follows.

$F_{DD} = 0.142$
$F_{DA} = 0.470$
$F_{AA} = 0.388$

Therefore, the found values of the diad fractions are close to the theoretical values. Furthermore, the copolymer had a block character P of 0.9.

It was found from the above described analysis that the above obtained copolymer was a copolymer wherein the dimethylbutadiene unit and the acetylene unit were bonded randomly and linearly.

EXAMPLE 25

A polymerization reaction was effected in the same manner as described in Example 23, except that 0.39 mole of chloroprene was used instead of isoprene and acetylene gas was introduced at a flow rate of 0.030 mole/hr, to obtain 1.10 g of a rubbery product. Chloroform-soluble part in this weighed 0.85 g (77.3% based on the product). The chloroform-soluble copolymer had an intrinsic viscosity [η] of 0.18 in toluene at 30°C.

Figure 4:
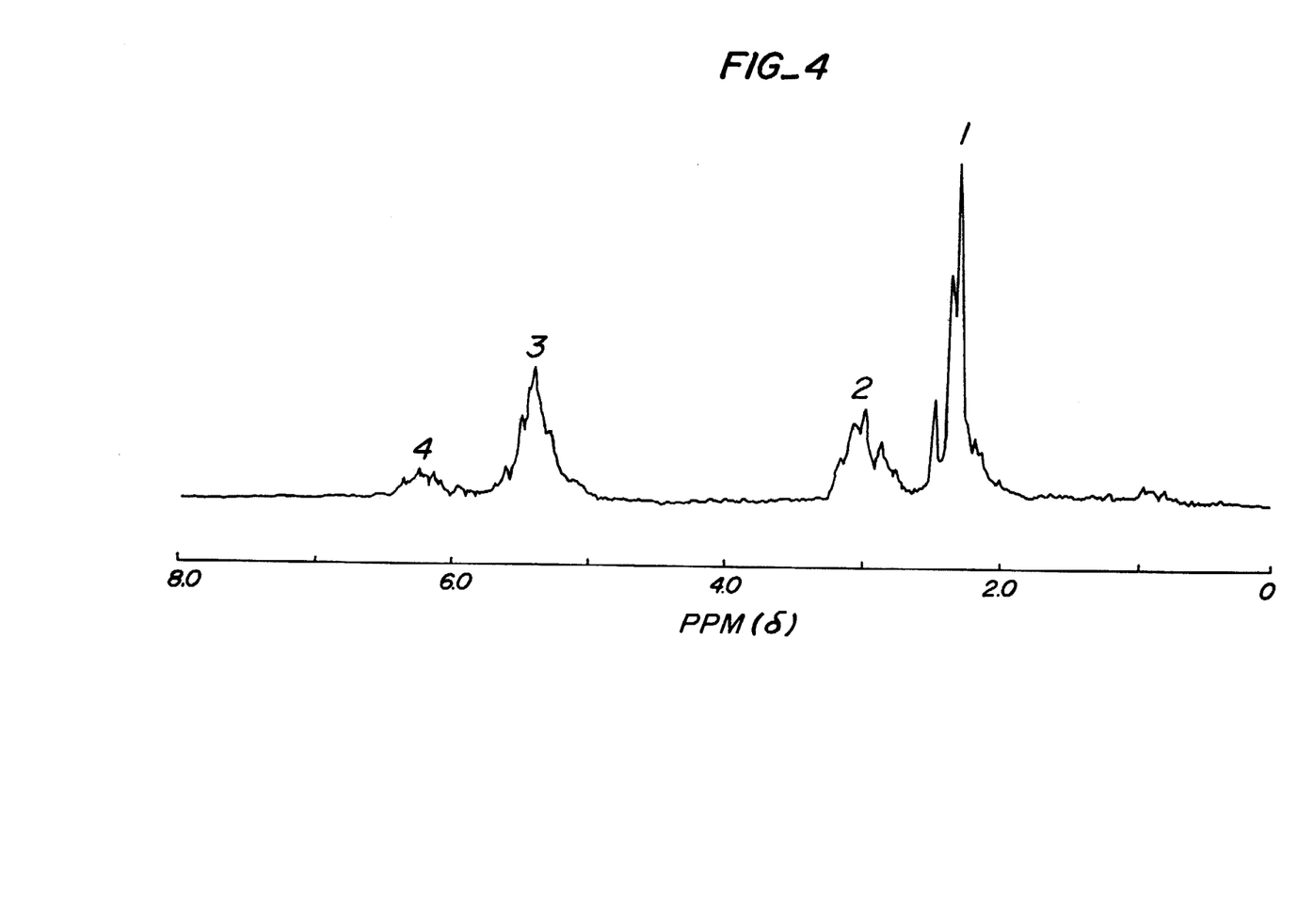
FIG. 4 is the nuclear magnetic resonance spectrum of the linear random copolymer of acetylene and chloroprene obtained in Example 25.

FIG. 4 shows the nuclear magnetic resonance spectrum of the resulting copolymer, which was measured in a solution of the copolymer in carbon disulfide at 60 MHz and at room temperature by using tetramethylsilane as an internal standard.

A group of the sharp peaks 1 at 2.32δ are assigned to methylene protons of chloroprene unit of chloroprene-chloroprene diad, which are shown by H in the following formula:

A group of the peaks 2 at ~2.98δ are assigned to diallyl type methylene protons, i.e., methylene protons of chloroprene unit of the acetylene-chloroprene sequence, which are shown by H in the following formulae:

and

The peak 3 at 5.38δ is assigned to methine protons of trans-1,4 type chloroprene unit and those of acetylene unit isolated by chloroprene units, which are shown by H in the following formulae:

and

The broad peak 4 at ~6.25δ is assigned to methine protons of acetylene unit of the acetylene-acetylene diad, which are shown by H in the following formula:

$$-CH_2-\underset{\substack{|\\Cl}}{C}=CH-CH_2+CH=CH+CH=CH+CH_2-\underset{\substack{|\\Cl}}{C}=CH-CH_2-$$

Since substantially no peak is observed in a field lower than the field of this peak, it can be seen that three or more acetylene sequence is substantially absent in the copolymer.

It was found from the nuclear magnetic resonance spectrum that the copolymer contained 41.0 mol% of acetylene units. Further, in the copolymer, substantially all the chloroprene units were bonded in trans-1,4 type, and 1,2-bond or 3,4-bond was substantially absent.

The diad fractions of the monomer unit sequences in the copolymer, which are used as a measure of the randomness, were found to be as follows.

$F_{CC} = 0.348$
$F_{CA} = 0.444$
$F_{AA} = 0.188$

In the above formulae, $F_{CC}$ is diad fraction of the chloroprene-chloroprene sequence, $F_{CA}$ is diad fraction of the chloroprene-acetylene sequence and $F_{AA}$ is diad fraction of the acetylene-acetylene sequence.

While, when it is assumed that chloroprene and acetylene were randomly copolymerized, the theoretical values of the diad fractions are as follows.

$F_{DD} = 0.348$
$F_{DA} = 0.484$
$F_{AA} = 0.168$

Therefore, the found values of the diad fractions are close to the theoretical values. Furthermore, the copolymer had a block character P of 0.9.

It was found from the above described analysis that the above obtained copolymer was a copolymer wherein the chloroprene unit and the acetylene unit were bonded randomly and linearly.

EXAMPLE 26

A polymerization reaction was effected in the same manner as described in Example 23, except that 3 moles of dicyclopentadienylnickel was used instead of nickel naphthenate, to obtain 1.2 g of a liquid rubbery product. The amount of chloroform-soluble part in this product was 86% based on the product. It was confirmed from the nuclear magnetic resonance spectrum that the chloroform-soluble rubbery material was a copolymer containing 40.2 mol% of acetylene units, wherein the acetylene unit and the butadiene unit were bonded randomly and linearly. Further, in this copolymer, 93% of the isoprene units were bonded in cis-1,4 type.

EXAMPLE 27

A polymerization reaction was effected in the same manner as described in Example 23. However, in this Example 27, an aluminum compound having a composition of $(C_2H_5)_2AlCl$, which had been prepared by reacting triethylaluminum and aluminum trichloride in a molar ratio of triethylaluminum/ aluminum trichloride = 2/1 in hexane, was used in an amount of 20 mmoles, calculated as aluminum, instead of diethylaluminum chloride, and a polymerization reaction was effected to obtain 7.8 g of liquid rubbery product. The amount of chloroform-soluble part in this product was 83% based on the product. It was confirmed from the nuclear magnetic resonance spectrum that the chloroform-soluble rubbery material was copolymer containing 42.6 mol% of acetylene units, wherein the acetylene unit and the butadiene unit were bonded randomly and linearly. Further, in this copolymer, 92% of the isoprene units were bonded in cis-1,4 type.

What is claimed is:

1. Acetylene-butadiene random copolymers, in which acetylene and butadiene are bonded linearly and randomly the block character P is within a range of 0.8–1.2, the butadiene portion has more than 80% of cis-1,4-structure and the acetylene content is less than 70 mol%.

2. Acetylene-isoprene random copolymers, in which acetylene and isoprone are bonded linearly and randomly, the block character P is within a range of 0.8–1.2, the isoprene portion has more than 80% in cis-1,4-structure and the acetylene content is less than 70 mol%.

3. Acetylene-2,3-dimethylbutadiene random copolymers, in which acetylene and 2,3-dimethylbutadiene are bonded linearly and randomly, the block character P is within a range of 0.8–1.2, the 2,3-dimethylbutadiene portion has trans-1,4-structure and the acetylene content is less than 70 mol%.

4. Acetylene-chloroprene random copolymers, in which acetylene and chloroprene are bonded linearly and randomly the block character P is within a range of 0.8–1.2, the chloroprene portion has trans-1,4-structure and the acetylene content is less than 70 mol%.

5. A method for producing acetylene-conjugated diene copolymers, in which acetylene and a conjugated diene compound are bonded linearly and randomly, the conjugated diene compound is bonded in 1,4-type and the acetylene content is less than 70 mol%, which comprises copolymerizing (1) acetylene and (2) a conjugated diene compound having the general formula where $R_a$ and $R_b$ represent hydrogen, halogen atom or hydrocarbon residue having 1–6 carbon atoms by means of a catalyst consisting of A. at least one of dialkylaluminum chlorides having the general formula
$R_2AlCl$
wherein R represents hydrocarbon residue having 1–6 carbon atoms, or a reaction mixture of at least one of aluminum chloride compounds having the general formula
$R'_{3-n}AlCl_n$
wherein R' represents hydrocarbon residue having 1–6 carbon atoms and $n$ is 3, 2 or 1.5 with at least one of trialkylaluminum compounds having the general formula R″₃Al wherein R″ represents hydrocarbon residue having 1–6 carbon atoms, the molar ratio of the sum of R′ and R″ to Cl being 1.8–2.2 and B. at least one of organic acid salts and organic complexes of nickel, the molar ratio of Al atom in (A) component to Ni atom in (B) component being 1–100, in a solvent selected from the group consisting of aliphatic hydrocarbons, alicyclic hydrocarbons, aromatic hydrocarbons and halogen derivatives thereof at a temperature of −80°C +100°C, the composition of acetylene based on the total monomer feed amount being less than 60 mol%.

6. The method as claimed in claim 5, wherein said conjugated diene is butadiene, isoprene, 2,3-dimethylbutadiene or chloroprene.

7. The method as claimed in claim 5, wherein the catalytic component (A) is diethylaluminum chloride.

8. The method as claimed in claim 5, wherein the catalytic component (A) is a combination of aluminum trichloride and triethylaluminum.

9. The method as claimed in claim 5, wherein the catalytic component (B) is nickel naphthenate, nickel formate or nickel benzoate.

10. The method as claimed in claim 5, wherein a molar ratio of Al atom in the catalytic component (A) to Ni atom in the catalytic component (B) is 2–30.

11. The method as claimed in claim 5, wherein a feeding ratio of acetylene based on the total monomers is less than 40 mol%.

12. The method as claimed in claim 5, wherein the polymerization temperature is 0–60°C.

13. The method as claimed in claim 5, wherein the polymerization reaction is carried out in a solvent of aromatic hydrocarbons.

14. The method as claimed in claim 5, wherein the polymerization reaction is carried out in a solvent of halogenated hydrocarbons.

15. The method as claimed in claim 13, wherein said aromatic hydrocarbon is toluene or xylene.

16. The method as claimed in claim 14, wherein said halogenated hydrocarbon is dichloroethane.

* * * * *